April 15, 1930.  R. HILDEBRANDT  1,754,891
PISTON
Filed July 21, 1928
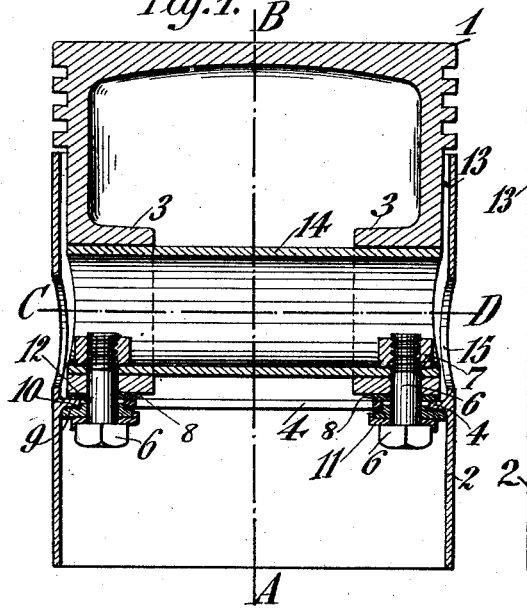
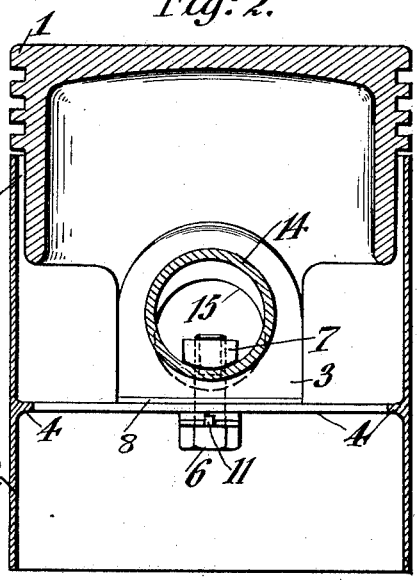
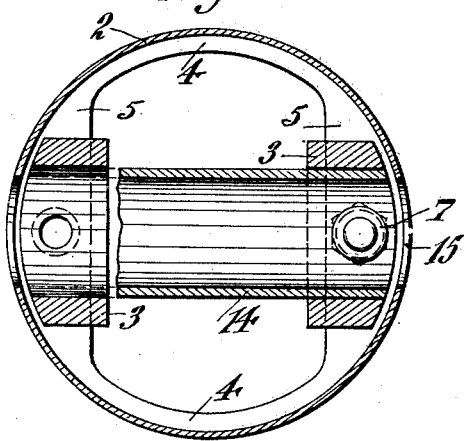
INVENTOR
Richard Hildebrandt
BY C. P. Goepel
ATTORNEY.

Patented Apr. 15, 1930

1,754,891

UNITED STATES PATENT OFFICE

RICHARD HILDEBRANDT, OF WEEHAWKEN, NEW JERSEY

PISTON

Application filed July 21, 1928. Serial No. 294,426.

My invention relates to pistons; especially pistons for engines such as internal combustion engines, steam engines; and pumps and other mechanical devices.

An object of the invention is to provide a piston of simple construction combining the advantages of the light weight metal piston with the all steel piston; which is easy to install and gives superior results in operation.

The nature of the invention is set forth in the following description and the novel features are pointed out in the appended claims; but the disclosure is illustrative only and I may change the details without departing from the principle of the invention or exceeding the scope of the terms in which the appended claims are expressed.

On the drawings Figure 1 is a vertical section through a piston according to my invention;

Fig. 2, a section on the line A—B of Fig. 1, and

Fig. 3 is a section on line C—D of Fig. 1.

The same numerals identify the same parts.

The body of the piston is indicated at 1 and it has the usual number of grooves for the piston rings. This body or head is comparatively small but it is encircled by a steel shell 2 which is made fast to this body and taken in combination with the head 1 gives to the piston the required length. The cylinder in which the piston is to operate, is of cast iron or grey cast iron; and the shell 2 of steel of the same coefficient of expansion as the cylinder. The head 1 has internal projections 3 disposed at opposite sides and the shell 2 is affixed to the head 1 by providing the shell with an internal flange or rib 4 which has relatively wide portions 5 to fit against the projections 3; these projections being perforated to give passage to bolts 6 which pass through the portions 5 and through openings in the projections 3, nuts 7 engaging the ends of the bolts to make them fast and hold the head 1 and shell 2 together. Between the rib 4 and the projections 3 I insert heat insulating plates 8. The openings in the wide portions 5 of the rib 4 may be somewhat larger than the bolt 6 so that heat-insulating washers 9 having projections 10 may be placed between the rib 4 and the heads of the bolts 6, these projections going into the openings through the parts 5 of the rib 4 to center the bolts. Between the heads of the bolts and the washers 9 I may place washers or packings 11, preferably of steel. The enlarged openings through the parts 5 are indicated by the numeral 12. The washers 9 may be so shaped that they fit against the inside of the shell 2, to be held against rotation; the washers 11 may be bent at opposite sides for engaging the washers 9 and the heads of bolts 6.

The head 1 and shell 2 are thus connected together and when so attached there will be a small annular space 13 between the shell and the body 1; the projections 3 may have openings therein to receive a tubular member 14 and this member may have perforations to receive the ends of the bolts 6 so that the nuts on the ends of these bolts are within this member 14. Adjacent the two ends of the member 14 the steel shell 2 may be perforated as at 15. The member 14 of course acts as a pin or journal for the connecting rod of the piston.

By thus connecting the steel shell 2 to the head 1 with heat insulating elements 8 between the rib 4 and projections 3 I obtain a piston which combines the durability and long life of the steel piston with the good heat conduction and small weight of the light metal piston. This piston operates noiselessly because piston play due to expansion from heat is avoided. The steel shell always has the same temperature as the cylinder containing the piston and can be inserted with very little play or space between it and the head 1. Also no knocking out of the eyes for the piston pin or journal is necessary The outside diameter of the head 1 is slightly less than that of the shell 2.

The annular air space 13 further helps to insulate the shell 2 from the body 1 and cooperates with the insulating parts 8. The shell 2 being of steel and the cylinder of cast iron, the shell conforms to the condition of the cylinder as respects expansion and contraction when the cylinder containing the piston is in operation; and the head 1 which forms the body of the piston and may be of different material, such as light metal; and has no effect upon the shell 2 and does not impair the working of the piston as a whole in case of any local expansion or contraction of the body 1. Its outside diameter being less than that of the shell the piston may expand more than the shell without the efficiency of operation being impaired.

It will be seen by inspection of Fig. 2 that one face of each nut 7 is rounded to have the same curvature as the inside of the member 14, hence these screws can be turned up tightly and the bolts 6 not only hold the head 1 and shell 2 together but also they operatively secure the journal 14 in place.

I claim:

1. A piston comprising a body, a metal shell of substantially the same coefficient of expansion as the cylinder in which the piston works, attached in a heat insulating manner to said body.

2. A piston comprising a body, a metal shell of substantially the same coefficient of expansion as the cylinder containing the piston, surrounding the body, connecting members between the body and shell, and heat insulating members interposed between the connecting members and the shell.

3. A piston comprising a body, having projections and a shell of substantially the same coefficient of expansion as the cylinder containing the piston surrounding the body, said shell having a rib with perforations, and fastening bolts passing through said perforations into said projections to unite the shell and body; said rib being prevented from making contact with said projections by interposed heat insulating material, and said bolts being prevented from making contact with said rib by interposed heat insulating material.

4. A piston comprising a body, a shell of substantially the same coefficient of expansion as the cylinder for containing the piston, surrounding the body and provided with a rib, a tubular member in said body, screws passing through the rib and said member and receiving bolts for connecting the body and the shell, heat insulating means between the rib and said member and washers between the heads of said bolts and said rib.

5. A piston comprising a body having circular projections, a tubular member surrounded by said projections, a shell surrounding the body and provided with a flange, said projections, tubular member and flange having aligned apertures, bolts passing through said apertures, and nuts on the bolts having convexly rounded faces engaging the concavely rounded interior face of the tubular member, whereby to secure the projections, tubular member and flange firmly together.

In testimony that I claim the foregoing as my invention, I have signed my name hereto.

RICHARD HILDEBRANDT.